(12) United States Patent
Carr

(10) Patent No.: US 8,213,962 B2
(45) Date of Patent: Jul. 3, 2012

(54) VEHICLE COMPUTER LINK TO MOBILE PHONE

(75) Inventor: Jeffrey Thomas Carr, Highland Village, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 433 days.

(21) Appl. No.: 12/506,920

(22) Filed: Jul. 21, 2009

(65) Prior Publication Data

US 2011/0021213 A1    Jan. 27, 2011

(51) Int. Cl.
*H04W 24/00* (2009.01)

(52) U.S. Cl. ............... 455/456.4; 455/26.1; 455/41.2

(58) Field of Classification Search ............ 455/513, 455/456; 370/328; 361/679.56, 727; 257/E21.318, 257/E21.266, E23.118, E21.279, E23.127; 703/13; 210/456
See application file for complete search history.

(56) References Cited

U.S. PATENT DOCUMENTS

| | | | |
|---|---|---|---|
| 6,181,996 B1 * | 1/2001 | Chou et al. | 701/36 |
| 7,873,374 B1 * | 1/2011 | O'Neil | 455/456.4 |
| 2004/0033795 A1 * | 2/2004 | Walsh et al. | 455/404.1 |
| 2009/0082951 A1 * | 3/2009 | Graessley | 701/200 |
| 2009/0240497 A1 * | 9/2009 | Usher et al. | 704/235 |
| 2010/0062788 A1 * | 3/2010 | Nagorniak | 455/456.1 |
| 2010/0128570 A1 * | 5/2010 | Smith et al. | 368/10 |
| 2010/0311403 A1 * | 12/2010 | McNally | 455/419 |

OTHER PUBLICATIONS

"New Devices Aim to Disable Cell Phones While Driving", http://www.foxnews.com/story/0,2933,480585,00.html, Jan. 18, 2009.

* cited by examiner

*Primary Examiner* — Nick Corsaro
*Assistant Examiner* — Mahendra Patel

(57) ABSTRACT

A method is implemented by a mobile device associated with a short-range wireless network in a vehicle. The method includes identifying a paired device within the short-range wireless network, the paired device having access to a vehicle information system, and receiving, from the paired device, vehicle status information from the vehicle information system. The mobile device determines if the vehicle status information triggers a safety mode for the mobile device and disables particular features or components of the mobile device based on the determination.

20 Claims, 9 Drawing Sheets

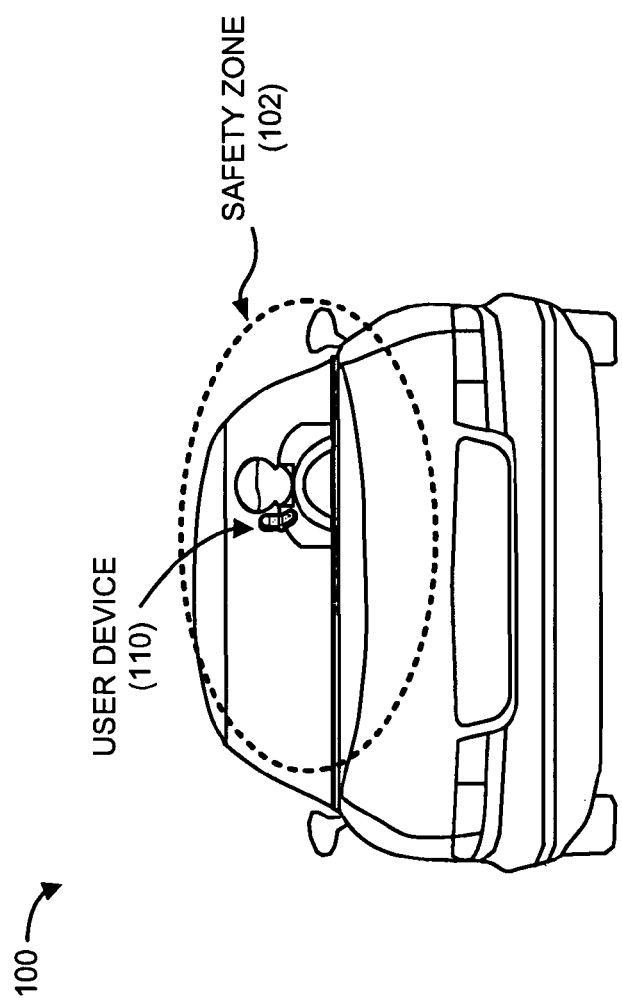

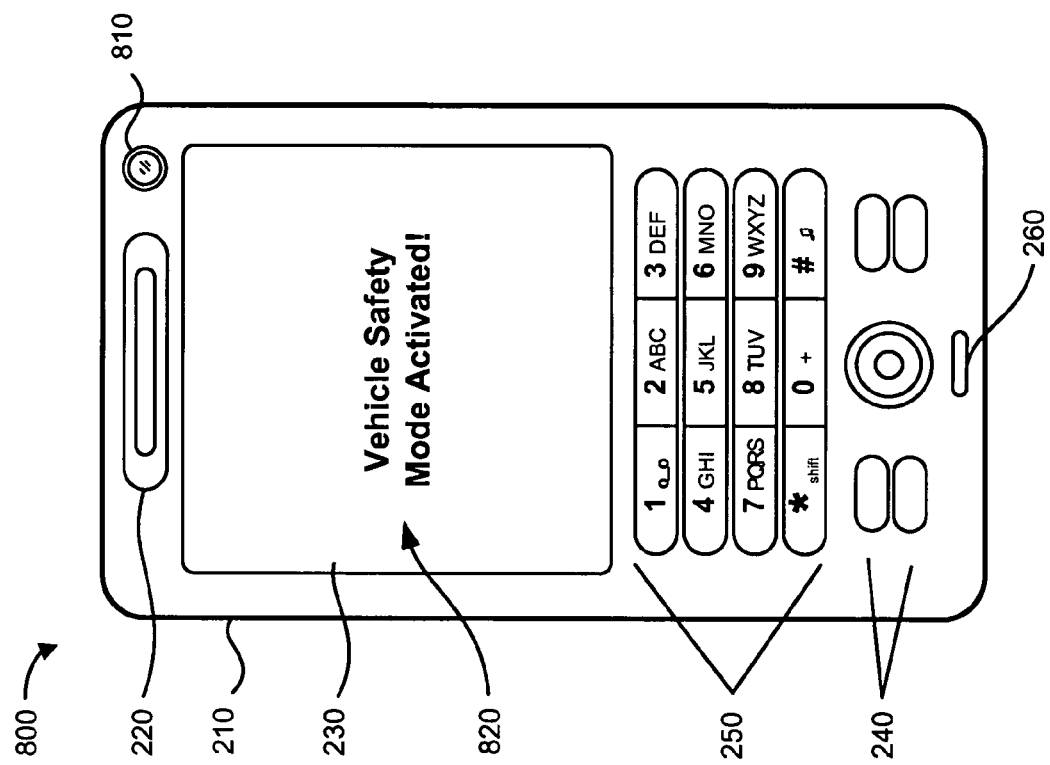

_US 8,213,962 B2_

VEHICLE COMPUTER LINK TO MOBILE PHONE

BACKGROUND INFORMATION

Mobile devices (e.g., cell phones, personal digital assistants (PDAs), etc.) can support an increasing variety of communications and other features. For example, a mobile device may send/receive telephone calls, emails, text messages, instant messages (IMs), etc.; present multimedia content, such as games, images, videos, music, etc.; and run other applications, such as organizers, web browsers, etc. Many of these mobile device features, while desirable in many circumstances, can serve as a distraction to a user whose attention should be focused elsewhere. Particularly, users operating a vehicle may be highly susceptible to distractions from certain features of mobile devices, and such distractions may place these users and others in the vehicle at risk.

BRIEF DESCRIPTION OF THE DRAWINGS

FIGS. 1A and 1B provide diagrams illustrating exemplary implementations of the concepts described herein;

FIG. 8 provides an illustration of an exemplary safety mode activated on a mobile device.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide for integration of a user device (e.g., a mobile phone) having short-range wireless network capabilities with a vehicle information system to allow for selectively disabling of some features of the user device. The disabling of features may be based on the location of the user device and/or information from the vehicle information system.

Figure 1B:
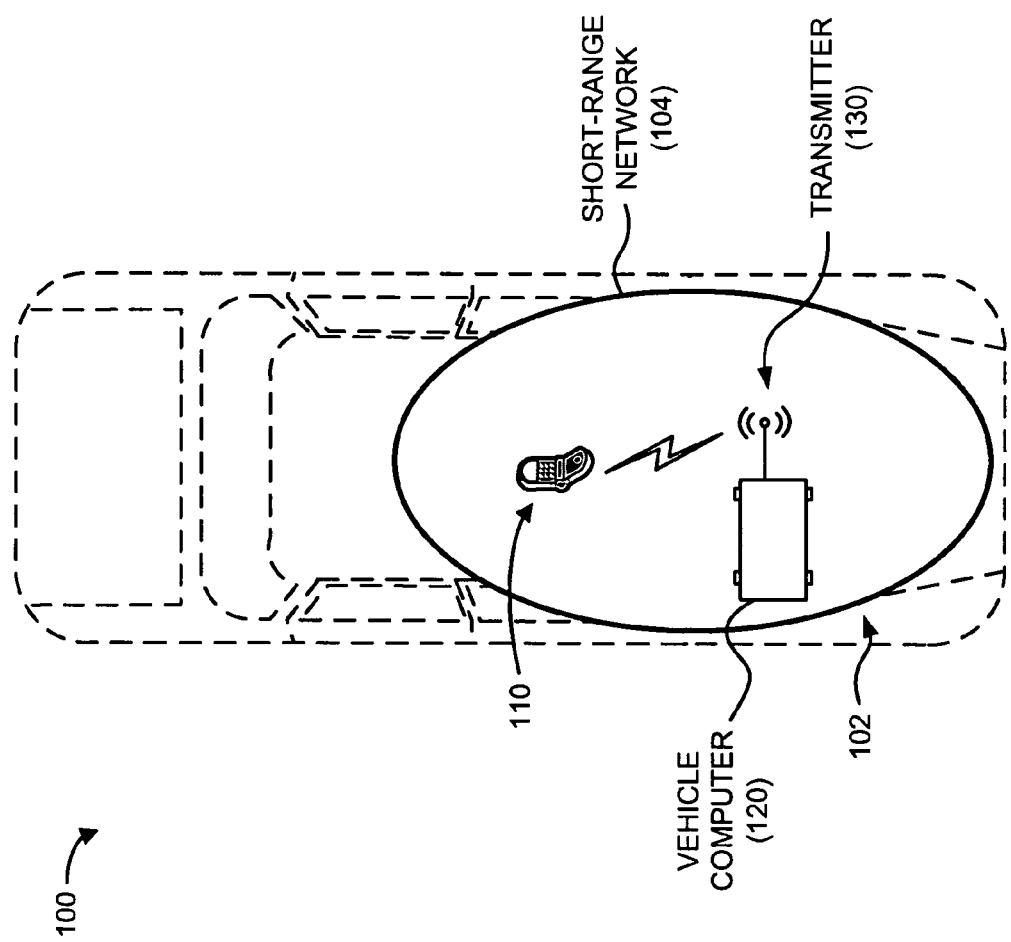

FIGS. 1A and 1B provide diagrams illustrating exemplary implementations of the concepts described herein. FIG. 1A depicts a front view of a vehicle 100 with a designated safety zone 102. FIG. 1B depicts a short-range network 104 in which safety zone 102 may be implemented.

Referring to FIG. 1A, vehicle 100 may include a vehicle (e.g., automobile, truck, motorcycle, boat, airplane, etc.) with an integrated vehicle information system (e.g., a computer systems operatively connected to sensors and other components within the vehicle) that can monitor information about the operation and/or conditions of the vehicle. Information about the operation and/or conditions of the vehicle may include vehicle speed, mechanical transmission status (e.g., gears in "park," "drive," "neutral," "reverse," etc. for the automatic transmission of an automobile), presence of passengers (e.g., based on weight sensors and/or door operations), proximity to other vehicles/objects (e.g., based on proximity sensors), and the like.

Safety zone 102 may include a region where particular features of a user device 110 may be disabled. For example, in one implementation, display of text (e.g., text messages, email, etc.), text creation, and manual calling functions (in contrast with hands-free calling functions) may be disabled when user device 110 is within safety zone 102. In other implementations, a display screen of user device 110 may be disabled. In still other implementations, all features of user device 110 may be disabled depending on vehicle operating conditions.

In an exemplary implementation, safety zone 102 may be dynamically activated. For example, safety zone 102 may be activated based on motion of vehicle 100 (e.g., any speed registered by a speedometer), the transmission position (e.g., switch to "drive" or "reverse"), and/or activation of a starter (e.g., turning a key in an ignition module or initiating an ignition signal from a key fob). Conversely, safety zone 102 may be de-activated based on the motion of vehicle 100 (e.g., a full stop), the transmission position (e.g., switch to "park"), and/or turning off the engine of vehicle 100. In other implementations, safety zone 102 may disable particular features of user device 110 based on certain vehicle information, while disabling other (or all) features of user device 110 based on different vehicle information. For example, a display of user device 110 may be deactivated based on motion of vehicle 100 (e.g., any speed registered by a speedometer), while all or additional features may be disabled based on proximity to another vehicle (e.g., following within a particular distance) and/or vehicle speed (e.g., travelling above a certain speed).

Referring to FIG. 1B, short range network 102 may include user device 110 and a vehicle computer 120 operatively connected to a transmitter 130. The area of safety zone 102 may be based on, for example, an area of short-range network 104 and/or a minimum wireless signal strength within short-range network 104. Short range network 104 may employ one or more wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used for short-range network 104.

User device 110 may include a device capable of transmitting and receiving data over short-range network 104. User device 110 may also include a device capable of transmitting and receiving data (e.g., voice, text, images, and/or multimedia data) over other wireless networks, such as one or more cellular networks (not shown). For example, user device 110 may include a handheld device, such as a cellular telephone or personal digital assistant (PDA), that includes a radiotelephone transceiver with Mobile Internet Protocol (Mobile IP) capabilities. In other implementations, user device 110 may include any type of device that is able to communicate via a short-range wireless network. For example, user device 110 may include any type of device that is capable of transmitting and/or receiving data to/from vehicle computer 120. In an exemplary implementation, user device 110 may include a multimedia (e.g., audio, video, images, etc.) player, a gaming device, binoculars, a camera, or another device capable of transmitting data over a short-range wireless protocol without providing access to a cellular network. In one implementation, user device 110 may communicate via packet-based or non-packet-based wireless transmissions. Further details of user device 110 are provided below in connection with, for example, FIGS. 2-4.

Vehicle computer 120 may include one or more computation or communication devices, that gather, process, search, and/or provide information in a manner described herein. In one implementation, vehicle computer 120 may be an original equipment manufacturer (OEM) component associated vehicle 100. Vehicle computer 120 may communicate with sensors and/or other components within vehicle 100 to collect various information about the operation and/or condition of vehicle 100. In an exemplary implementation, vehicle computer 120 may establish a data connection with user device 110, and may transmit to user device 110 (e.g., via transmitter 130) real-time (or near-real time) vehicle information.

Vehicle computer 120 may be operatively connected to sensors and other components within vehicle 100, such as a speedometer, a tachometer, an odometer, proximity sensors, moisture sensors, transmission controls, door sensors, seat sensors, a navigation system, a GPS, etc. In one implementation, vehicle computer 120 may transmit particular vehicle information relevant to the deployment of safety zone 102, such as vehicle speed, mechanical transmission status, presence of passengers, proximity to other vehicles/objects, etc. In another implementation, vehicle computer 120 may transmit particular vehicle information in the context of other available data. For example, vehicle speed may be provided in the context of a posted speed limit for a particular road (e.g., based on GPS and/or other navigational information available on vehicle computer 120). As another example, vehicle 100's proximity to other vehicles/objects may be provided in the context of the speed of vehicle 100.

Transmitter 130 may convert baseband signals from vehicle computer 120 into radio frequency (RF) signals and transmit the RF signals over the air (e.g., to user device 110). In one implementation, transmitter 130 may include a low-power signal that can be adjusted to the match the desired size of safety zone 102 for a particular vehicle. For example, depending on the location of transmitter 130 within vehicle 100, the effective range of transmitter 130 may be adjusted between about three (3) feet and thirty (30) feet, and, in another implementation, between four (4) feet and eight (8) feet.

In implementations herein, user device 110 may automatically initiate a connection with, for example, vehicle computer 120 over short-range network 104 when user device 110 is within the area of short-range network 104. Vehicle computer 120 may transmit vehicle information to user device 110, allowing user device 110 to apply safety features (e.g., disabling of particular operations) based on the current conditions of vehicle 100.

In another implementation, if vehicle computer 120 does not recognize a user device including a safety mode (e.g., vehicle computer does not detect any compatible devices within short range network 104 or does not recognize a paired device as having a safety mode), vehicle computer 120 may enforce safety zone 102 by "jamming" all cellular activity within safety zone 102.

Although FIGS. 1A and 1B show exemplary components of safety zone 102, in other implementations, safety zone 102 may contain fewer, different, differently arranged, or additional, components than depicted in FIGS. 1A and 1B. In still other implementations, one or more components of safety zone 102 may perform one or more other tasks described as being performed by one or more other components of safety zone 102.

Figure 2:
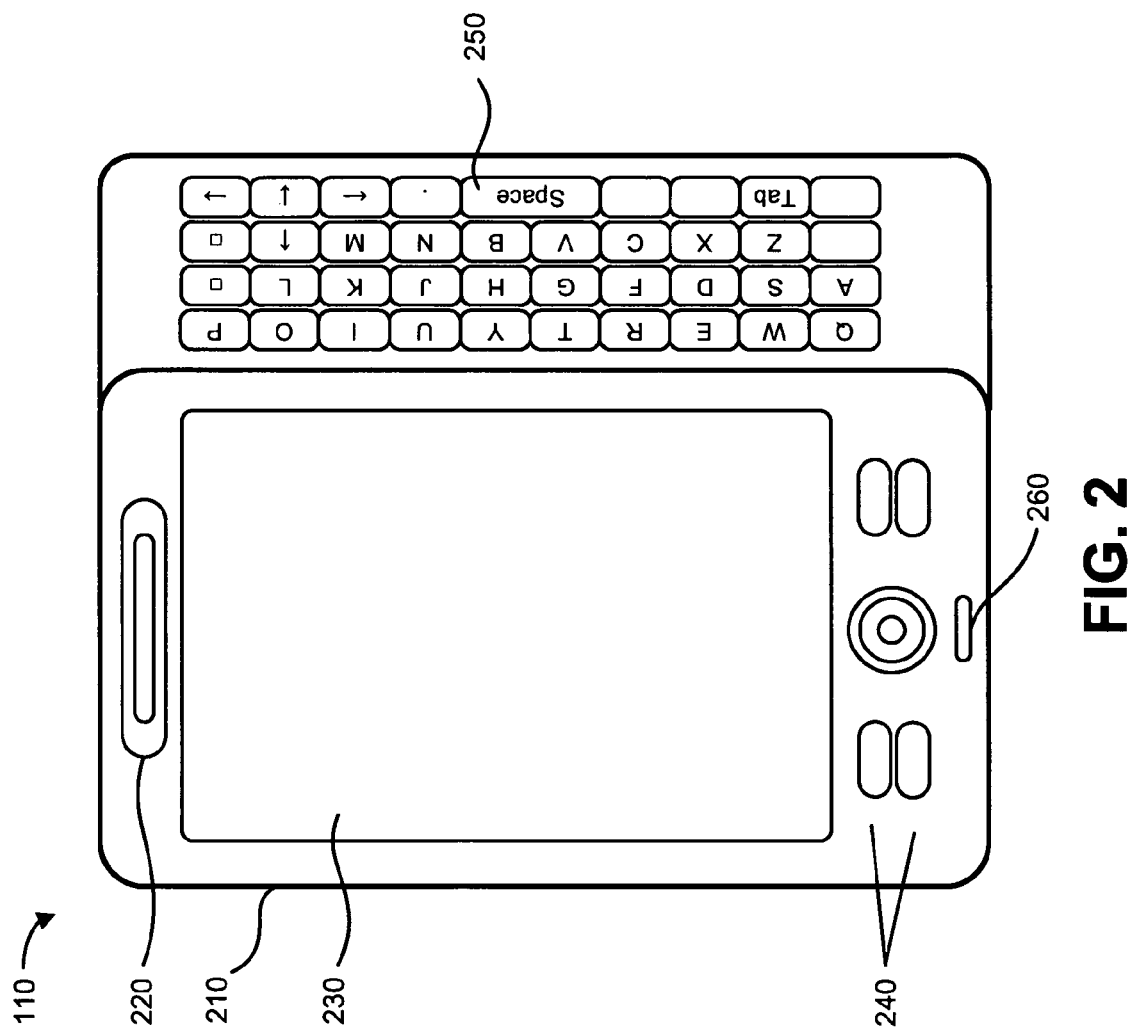
FIG. 2 depicts an exemplary user device of FIG. 1A.

FIG. 2 is a diagram of an exemplary user device 110 in which systems and/or methods described herein may be implemented. User device 110 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a personal gaming system, a global positioning system (GPS) unit, a laptop or mobile computer, or other types of computation or communication devices (e.g., that can receive and/or generate communications), a thread or process running on one of these devices, and/or an object executed by on of these devices.

As illustrated in FIG. 2, user device 110 may include a housing 210, a speaker 220, a display 230, control buttons 240, a keypad 250, and/or a microphone 260. Housing 210 may protect the components of user device 110 from outside elements. For example, housing 210 may be formed from plastic, metal, or a composite, and may be configured to support speaker 220, display 230, control buttons 240, keypad 250 and/or microphone 260.

Speaker 220 may provide audible information to a user of user device 110. Speaker 220 may be located in an upper portion of user device 110, and may function as an ear piece when a user is engaged in a communication session using user device 110. Speaker 220 may also function as an output device for speakerphone functions, alert tones, and music and/or audio information associated with games and/or video images played on user device 110.

Display 230 may provide visual information to the user. For example, display 230 may display text input into device 100, text, images, video, and/or graphics received from another device, and/or information regarding incoming or outgoing calls or text messages, emails, media, games, phone books, address books, the current time, etc. For example, screen 310 may include a liquid crystal display (LCD), such as a thin film transistor (TFT) LCD, etc. In one implementation, display 230 may include a touch screen display that may be configured to receive a user input when the user touches (or comes in close proximity to) display 230.

Control buttons 240 may permit the user to interact with user device 110 to cause user device 110 to perform one or more operations. For example, control buttons 240 may be used to cause user device 110 to transmit information.

Keypad 250 may include a standard telephone keypad, a QWERTY-like layout (as shown) with a traditional configuration of typewriter or computer keyboard keys, or another keypad layout. In one implementation, keypad 250 may be moveably secured to housing 210 to allow keypad 250 to be concealed when not in use. Keypad 250 may be an optional component.

Microphone 260 may receive audible information from the user. For example, microphone 260 may receive audio signals from the user and may output electrical signals corresponding to the received audio signals.

Although FIG. 2 shows exemplary components of user device 110, in other implementations, user device 110 may contain fewer, different, differently arranged, or additional components than depicted in FIG. 2. In still other implementations, a component of user device 110 may perform one or more tasks described as being performed by another component of user device 110.

Figure 3:
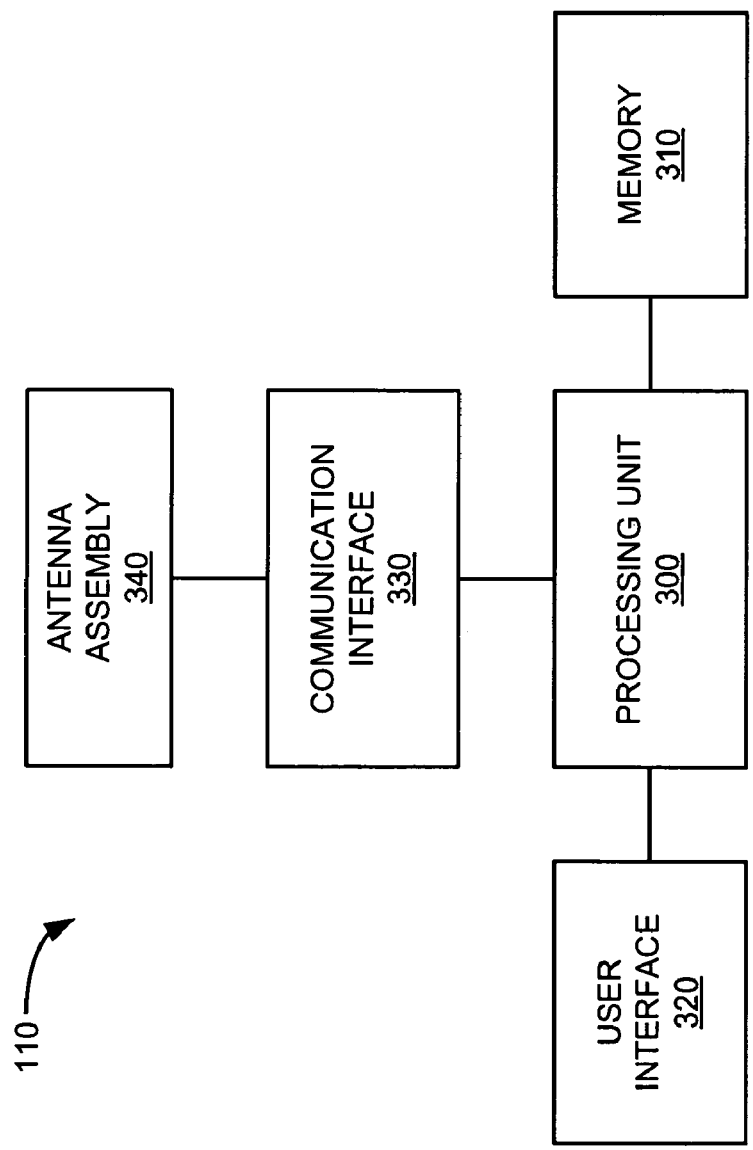
FIG. 3 depicts a diagram of exemplary components of the user device of FIG. 1A.

FIG. 3 is a diagram of exemplary components of user device 110. As illustrated, user device 110 may include a processing unit 300, memory 310, a user interface 320, a communication interface 330, and/or an antenna assembly 340.

Processing unit 300 may include one or more processors, microprocessors, application specific integrated circuits (ASICs), field programmable gate arrays (FPGAs), or the like. Processing unit 300 may control operation of user device 110 and its components. In one implementation, processing unit 300 may control operation of components of user device 110 in a manner described herein.

Memory 310 may include a random access memory (RAM), a read-only memory (ROM), and/or another type of memory to store data and instructions that may be used by processing unit 300. In one implementation, memory 310 may store instructions for disabling particular features and/or components of user device 110 based on vehicle status information.

User interface 320 may include mechanisms for inputting information to user device 110 and/or for outputting information from user device 110. Examples of input and output mechanisms might include buttons (e.g., control buttons, keys of a keypad, a joystick, etc.) or a touch screen interface to permit data and control commands to be input into user device 110; a speaker to receive electrical signals and output audio signals; a microphone to receive audio signals and output electrical signals; and/or a display to output visual information (e.g., text input into user device 110).

Communication interface 330 may include, for example, a transmitter that may convert baseband signals from processing unit 300 to RF signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network (e.g., vehicle computer 120 via short-range network 104).

As will be described in detail below, user device 110 may perform certain operations in response to processing unit 300 executing software instructions of an application contained in a computer-readable medium, such as memory 310. A computer-readable medium may be defined as a physical or logical memory device. A logical memory device may include memory space within a single physical memory device or spread across multiple physical memory devices. The software instructions may be read into memory 310 from another computer-readable medium or from another device via communication interface 330. The software instructions contained in memory 310 may cause processing unit 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of user device 110, in other implementations, user device 110 may contain fewer, different, differently arranged, or additional components than depicted in FIG. 3. In still other implementations, one or more components of user device 110 may perform one or more other tasks described as being performed by one or more other components of user device 110.

Figure 4:
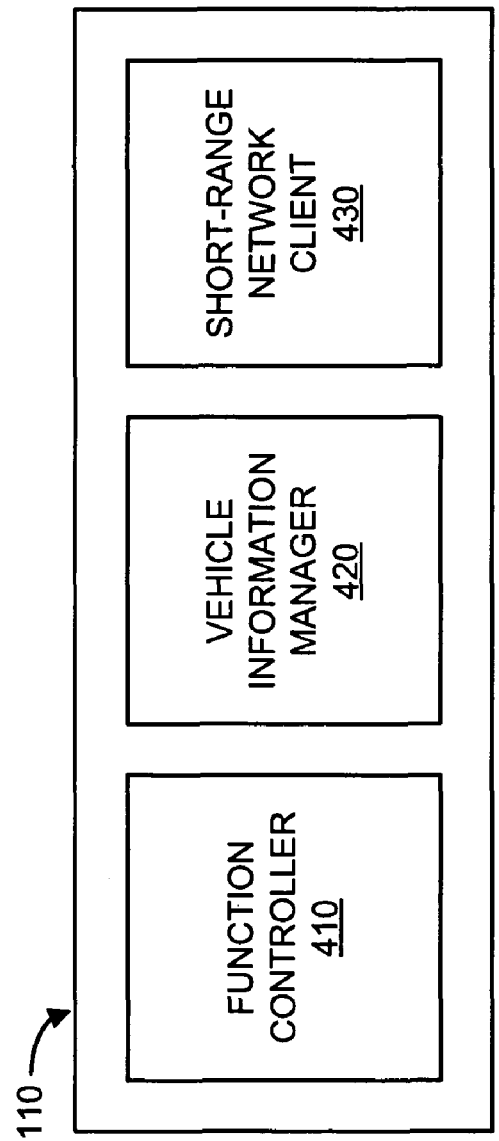
FIG. 4 depicts a functional block diagram of the user device of FIG. 1A.

FIG. 4 provides a functional block diagram of user device 110. As shown in FIG. 4, user device 110 may include a function controller 410, a vehicle information manager 420, and a short-range network client 430.

Function controller 410 may include hardware or a combination of software and hardware to facilitate selective disabling of particular features and/or components of user device 110. Function controller 410 may receive signals from vehicle information manager 420 instructing function controller when to block the particular features and/or components. For example, function controller 410 may disable features that require visual interaction with user device, such as text entry/display (email, text messaging, etc.), settings/tools options, visual media (e.g., videos, images, multimedia messaging service (MMS), etc.) and the like. In other implementations, function controller 410 may simply disable a display (e.g., display 230) of user device 110. In still other implementations, all features of user device 110 may be disabled. Function controller 410 may disable different features based on the instructions from vehicle information manager 420. Function controller 410 may include a warning indication (e.g., a visible/audible message, tone, vibration, or other indication) to indicate to a user that user device 110 is entering/exiting a safety mode. In one implementation, function controller 410 may also provide a notification (e.g., an audible message, tone, text message, or other indication) to parties of an existing call (e.g., user devices of other parties in communication with user device 110) that feature of user device 110 have been disabled.

Vehicle information manager 420 may include hardware or a combination of software and hardware to receive vehicle information from vehicle computer 120 and to identify instances when functions and/or components of user device 110 may be disabled based on the vehicle information. For example, vehicle information manager 420 may receive vehicle information indicating vehicle 100 is in motion (e.g., based on a speedometer reading relayed by vehicle computer 120). Based on the vehicle information, vehicle information manager 420 may send a signal to function controller 410 to disable particular features and/or components of user device 110. Vehicle information manager 420 may instruct function controller 410 to disable different features of user device 110 based on multiple types of information received from vehicle computer 120. For example, certain visual features of user device 110 may be disabled when vehicle 100 is in motion, while all features may be disabled when vehicle 100 is in close proximity to another vehicle and/or traveling above a particular speed.

In one implementation, vehicle information manager 420 may also manage communications with vehicle computer 120. For example, vehicle information manager 420 may probe for signals from a vehicle computer at regular intervals. In another example, vehicle information manager 420 may link with vehicle computer 120 by a predetermined coded wireless interface between user device 110 and vehicle computer 120 that is required to engage ignition and start the vehicle. The predetermined coded wireless interface may then continue with the safety mode activation of user device 110 by vehicle information manager 420.

Because different vehicles and/or vehicle information systems may not collect/provide the same type of data, in some implementations, vehicle information manager 420 may apply different data to determine if particular features and/or components of user device 110 should be disabled. For example, vehicle information manager 420 may base activation of a safety mode on the transmission position of one vehicle, on the speedometer reading of another vehicle, and/ or on starting the engine of another vehicle. In other implementations, vehicle information manager 420 may apply multiple types of information to determine if particular features and/or components of user device 110 should be disabled. For example, in an exemplary implementation, vehicle information manager 420 may analyze a combination of vehicle speed, seat sensors, door sensors, and signal strength information to distinguish between use (e.g., in safety mode) of user device 110 by an operator of vehicle 100 and use (e.g., in a normal mode) of user device 110 by a passenger of vehicle 110.

Short-range network client 430 may include hardware or a combination of software and hardware to identify devices (e.g., vehicle computer 120) paired with user device 110 under one or more short-range protocols and to establish a network connection with vehicle computer 120. Short-range network client 430 may also identify information and/or types of information available on vehicle computer 120. For example, short-range network client 430 may identify what kind of information (e.g., speed, transmission position, driver/passenger locations, etc.) vehicle computer 120 is configured to provide.

Although FIG. 4 shows exemplary functional components user device 110, in other implementations, user device 110 may contain fewer, different, differently arranged, or additional functional components than depicted in FIG. 4. In still other implementations, one or more functional components of user device 110 may perform one or more other tasks described as being performed by one or more other functional components of user device 110.

Figure 5:
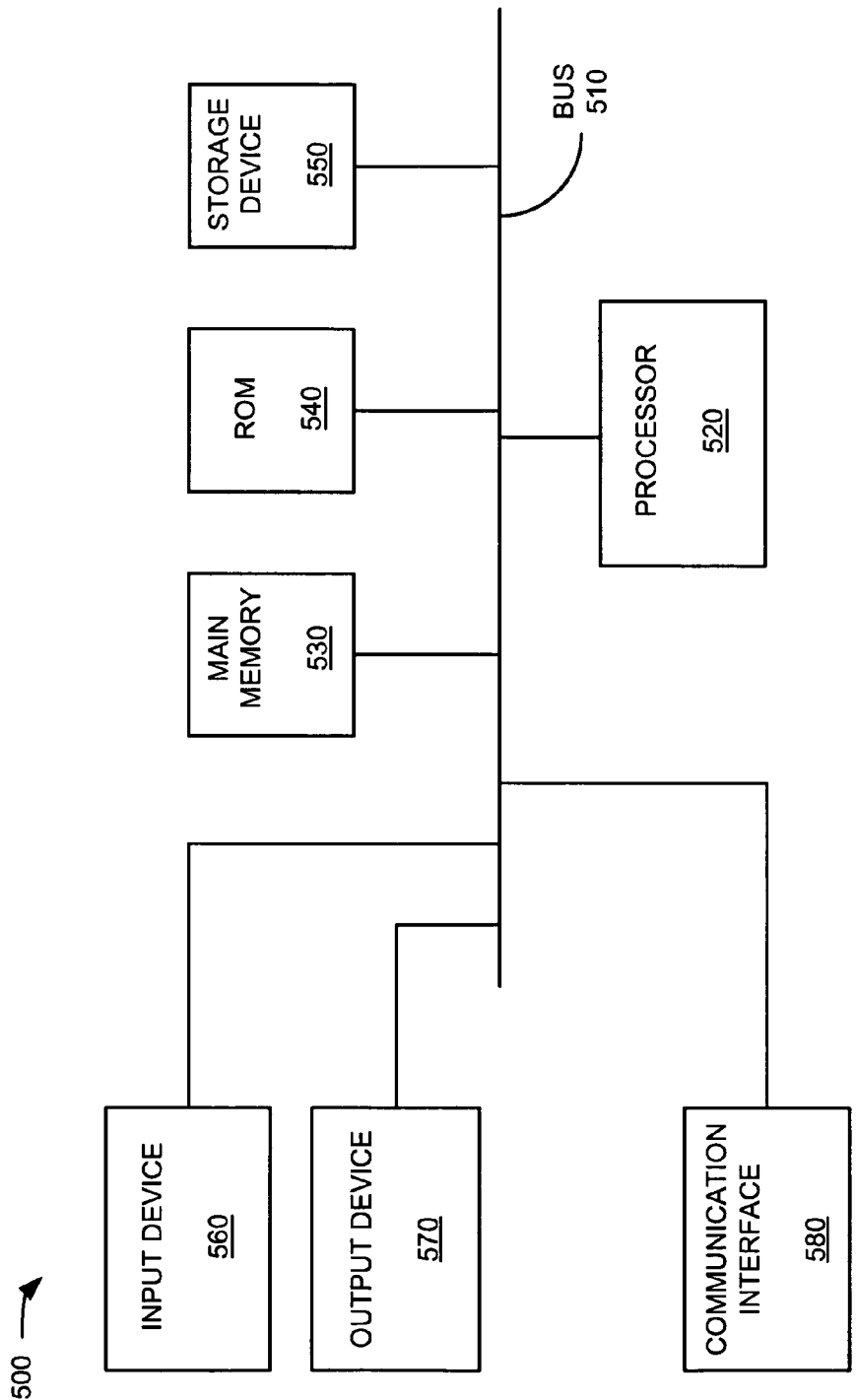
FIG. 5 depicts a diagram of exemplary components of a vehicle computer of FIG. 1B.

FIG. 5 depicts a diagram of exemplary components of a device 500 that may correspond to vehicle computer 120 and/or user device 110 (e.g., if user device 110 is a laptop computer). As illustrated, device 500 may include a bus 510, a processing unit 520, a main memory 530, a ROM 540, a storage device 550, an input device 560, an output device 570, and/or a communication interface 580. Bus 510 may include a path that permits communication among the components of device 500.

Processing unit 520 may include one or more processors, microprocessors, or other types of processors that may interpret and execute instructions. Main memory 530 may include a RAM or another type of dynamic storage device that may store information and instructions for execution by processing unit 520. ROM 540 may include a ROM device or another type of static storage device that may store static information and/or instructions for use by processing unit 520. Storage device 550 may include a magnetic and/or optical recording medium and its corresponding drive.

Input device 560 may include a mechanism that permits an operator to input information to device 500, such as a keyboard, a mouse, a pen, a microphone, voice recognition and/or biometric mechanisms, a touch screen, etc. Output device 570 may include a mechanism that outputs information to the operator, including a display, a printer, a speaker, etc. Communication interface 580 may include any transceiver-like mechanism that enables device 500 to communicate with other devices and/or systems. For example, communication interface 580 may include mechanisms for communicating with another device or system via a network, such as short-range network 104.

As described herein, device 500 may perform certain operations in response to processing unit 520 executing software instructions contained in a computer-readable medium, such as main memory 530. The software instructions may be read into main memory 530 from another computer-readable medium, such as storage device 550, or from another device via communication interface 580. The software instructions contained in main memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows exemplary components of device 500, in other implementations, device 500 may contain fewer, different, differently arranged, or additional components than depicted in FIG. 5. In still other implementations, one or more components of device 500 may perform one or more other tasks described as being performed by one or more other components of device 500.

Figure 6:
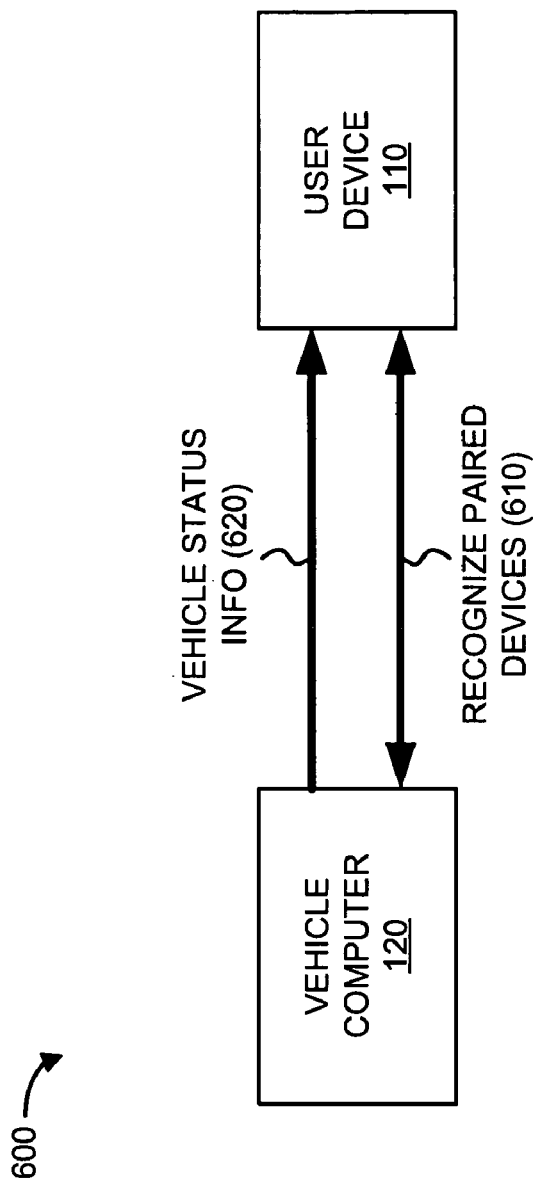
FIG. 6 illustrate diagrams of exemplary interactions among components of an exemplary portion of the network depicted in FIG. 1B.

FIG. 6 illustrates a diagram of exemplary interactions among components of an exemplary portion 600 of the short range network 104. As illustrated, exemplary network portion 600 may include user device 110 and vehicle computer 120. User device 110 and vehicle computer 120 may include features described above in connection with, for example, FIGS. 1A and 1B.

As shown in FIG. 6, user device 110 may recognize one or more paired devices over a short-range network as shown by reference number 610. For example, user device 110 may use Bluetooth protocols to identify vehicle computer 120. In another example, user device 110 may use a Wi-Fi protocol to identify vehicle computer 120. User device 110 and vehicle computer 120 may establish a paired relationship, for example, by creating a link key and/or by establishing communications over an encrypted link. As part of establishing the paired relationship, vehicle computer 120 may provide to user device 110 a device name, a vehicle class, a list of types of vehicle information, and/or other technical information associated with vehicle computer 120.

The connection between vehicle computer 120 and user device 110 may permit transmission of vehicle data to user device 110, as indicated by vehicle status information 620. For example, vehicle computer 120 may send vehicle status information 620 that user device 110 (e.g., function controller 410) may use to determine when and/or what features of user device 110 to block. Vehicle status information 620 may be sent, for example, on a real-time continuous basis. In other implementations, vehicle status information may be sent (by vehicle computer 120) or received (by user device 110) at regular intervals (e.g., 1 to 5 second intervals) to conserve resources.

Although FIG. 6 shows exemplary components of network portion 600, in other implementations, network portion 600 may contain fewer, different, differently arranged, or additional components than depicted in FIG. 6. In still other implementations, one or more components of network portion 600 may perform one or more other tasks described as being performed by one or more other components of network portion 600.

Figure 7:
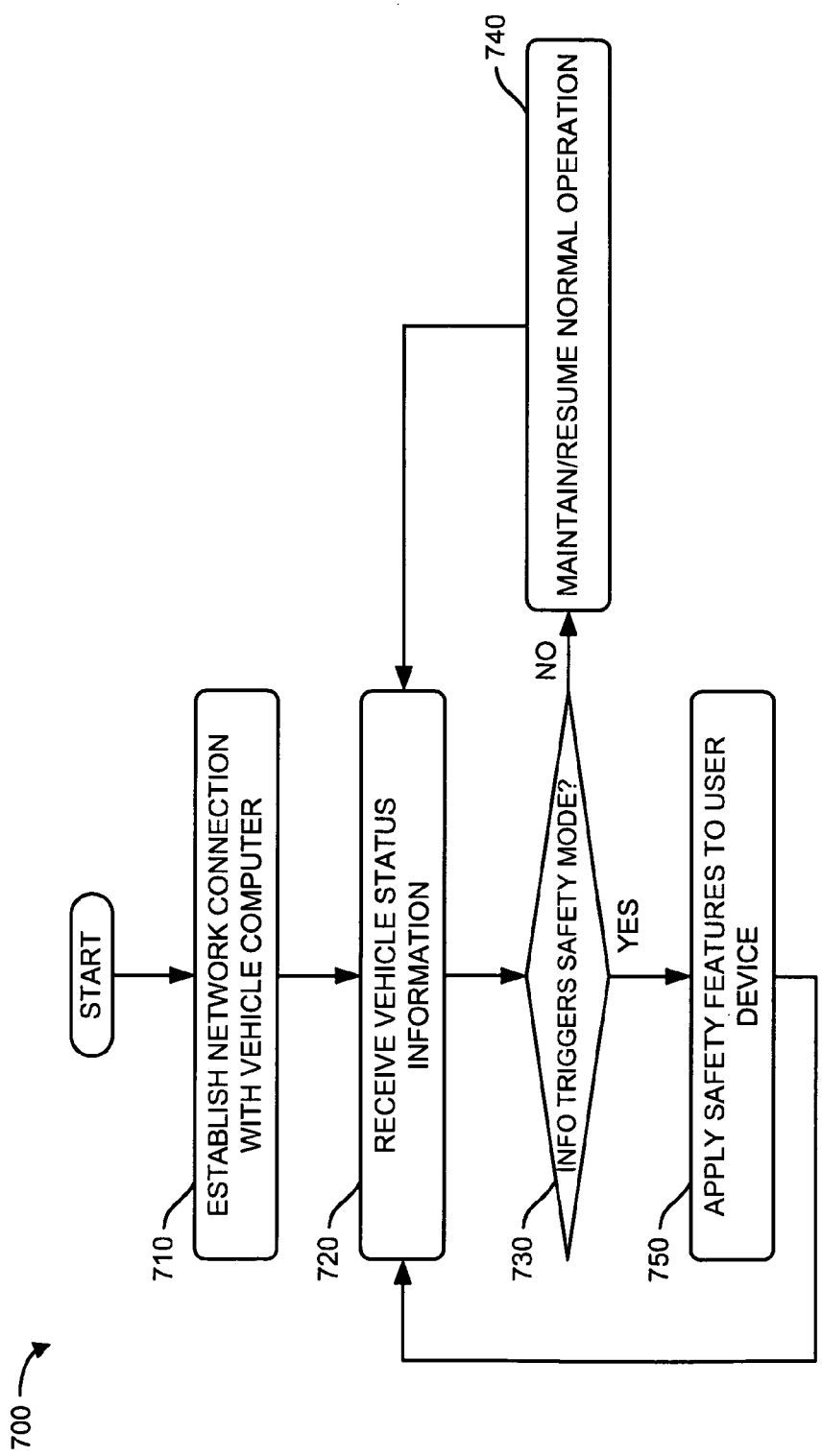
FIG. 7 depicts a flow chart of an exemplary process for limiting user device features based on vehicle information in a short-range network according to implementations described herein.

FIG. 7 depicts a flow chart of an exemplary process 700 for limiting user device features based on vehicle information in a short-range network according to implementations described herein. In one implementation, process 700 may be performed by user device 110. In other implementations, some or all of process 700 may be performed by another device or group of devices (e.g., communicating with user device 110), such as vehicle computer 120.

As illustrated in FIG. 7, process 700 may include establishing a network connection with a vehicle computer (block 710). For example, in implementations described above in connection with FIG. 6, user device 110 may recognize vehicle computer 120 over short-range network 104 as shown by reference number 610. User device 110 may use Bluetooth, Wi-Fi, and/or other short-range wireless protocols to identify vehicle computer 120 and available information about vehicle computer 120.

Vehicle status information may be received (block 720). For example, in implementations described above in connection with FIGS. 4 and 6, user device 110 (e.g., vehicle information manager 420) may receive status information from vehicle computer 120 that may be relevant to a determination of when/if to disable particular features of user device 110. Status information may include a single indicator (e.g., speed of vehicle 100) or multiple indicators (e.g., speed, transmission position, seat sensors, external proximity sensors, etc.).

It may be determined of the vehicle status information triggers a safety mode (block 730). For example, in implementations described above in connection with FIG. 4, user device 110 (e.g., vehicle information manager 420) may identify information from vehicle computer 120 and compare the information against criteria (e.g., vehicle movement, transmission positions, ignition activation, etc.) for a safety mode. If the vehicle status information does not trigger a safety mode (block 730—NO), process 700 may maintain normal operation (block 740) and return to block 720 to receive additional vehicle status information.

If the vehicle status information triggers a safety mode (block 730—YES), safety features may be applied to the user device (block 750). For example, in implementations described above in connection with FIG. 4, user device 110 (e.g., vehicle information manager 420) may identify information from vehicle computer 120 that triggers disabling of particular features and/or components of user device 110. User device (e.g., function controller 410) may then disable the particular features and/or components of user device 110. Once the particular features and/or components of user device 110 are disabled, process 700 may return to block 720 to receive additional vehicle status information.

In another implementation, the application of safety features in block 750 may include user device 110 (e.g., vehicle information manager 420) issuing a warning to the user (i.e., driver) either via the vehicle instrument panel, an audible alert, or user device 110. The warning may include, for example, an indication that the vehicle operating conditions (e.g., use of user device 110 in conjunction with excessive speed, a following distance that is too close for safe operation of the vehicle, etc.) appear unsafe and if not corrected, additional features of user device 110 will be disabled. Disabling of additional features may include, for example, terminating a call in progress, placing an existing call on hold until the unsafe condition is corrected, and/or notifying another party on the existing call that a call has been interrupted. The notification to the other calling party may include, for example, an audible indication (e.g., a recorded voice communication) or another indication.

FIG. 8 depicts an example implementation of a safety mode activated on user device 800. User device 800 may include housing 210, speaker 220, display 230, control buttons 240, keypad 250, microphone 260, and/or a camera 810. Other components, such as an additional display, additional control buttons, connectivity ports, memory slots, and/or additional speakers may be located on device 800, including, for example, on a rear or side panel of housing 810. Housing 210, speaker 220, display 230, control buttons 240, keypad 250, and microphone 260 may include features described above in connection with, for example, FIG. 2. Camera 810 may be provided on a front side (as shown) or back side of user device 110, and may enable user device 110 to capture and/or store video and/or images (e.g., pictures). User device 800 may be equipped with a vehicle safety mode, according to implementations described herein.

In an exemplary operation, a user of user device 800 may enter a vehicle (e.g., vehicle 100) as an intended operator (e.g., a driver). The location of user device 800 (e.g., on the person of the user) may be within range of a signal (e.g., from transmitter 130) for a vehicle information system associated with vehicle 100. User device 800 may establish a connection with the vehicle information system (e.g., vehicle computer 120) and begin to receive vehicle information relevant to the operation and/or conditions of vehicle 100.

When the user (e.g., driver) begins to operate the vehicle such that the vehicle begins to move, user device 800 may receive vehicle information from the vehicle information system indicating the movement. The information indicating movement may trigger a safety mode for user device 110. Thus, user device 800 may disable particular features and/or components of user device 800, such as keypad 250, camera 810, one or more of control buttons 240, and particular software applications. Voice and audio features of user device 800 may be limited to "hands free" tools such as headsets or Bluetooth ear/voice devices. In contrast, other features and/or applications may remain operational while in the safety mode, such as speaker 220, microphone 260, one or more other control buttons, and/or particular software applications (e.g., voice-activated applications and/or navigation applications). In one implementation, when user device 800 is in the safety mode, display 230 may be restricted to a limited functionality, such as a notice 820 (e.g., "Vehicle Safety Mode Activated!").

Assume, after a period of driving, that the vehicle comes to a complete stop to pick up a passenger. Mobile device 800 may receive vehicle information from the vehicle information system indicating cessation of movement and return mobile device 800 to a normal (e.g., unrestricted) mode. When the passenger enters the vehicle, door and/or seat sensor information may be provided to mobile device 800 that may be interpreted by mobile device 800 as indication of a passenger within the vehicle. The user of mobile device 800 (e.g., the driver) may hand mobile device 800 to the passenger and begin to operate the vehicle such that the vehicle again begins to move. Based on the relative change in location from the driver to the passenger, user device 800 may identify a change in the signal strength from the vehicle information system. User device 800 may also receive an indication of movement from the vehicle information system. User device 800 may assess the change in signal strength from the vehicle information system, along with the door and/or seat sensor information, to determine that user device 800 may now be in the possession of a passenger. Thus, mobile device 800 may disregard the indication of movement from the vehicle information system and maintain user device 800 in the normal mode.

Systems and/or methods described herein may provide for disabling of mobile device features based on information from a vehicle information system. The mobile device may be associated with a short-range wireless network in a vehicle and identify a paired device (e.g., a vehicle computer) within the short-range wireless network, the paired device having access to a vehicle information system. The mobile device may receive, from the paired device, vehicle status information from the vehicle information system. The mobile device may then determine if the vehicle status information triggers a safety mode for the mobile device and disable particular features and/or components of the mobile device based on the determination.

Systems and/or methods described herein may allow for accurate prediction of vehicle operating conditions so that a user device may be effectively limited/disabled during some operating conditions (e.g., driving a moving vehicle), while enabling normal mobile device operation during other operating conditions where use of a mobile device would not present a hazard (e.g., adjusting windows, radio, tailgate, etc. in a stationary vehicle).

The foregoing description provides illustration and description, but is not intended to be exhaustive or to limit the embodiments to the precise form disclosed. Modifications and variations are possible in light of the above teachings or may be acquired from practice of systems and methods disclosed herein.

For example, while particular implementations have been provided with respect to vehicle computer 120 being part of a vehicle information system for an automobile, implementations may be applicable to a wide variety of operator controlled vehicles that include on-board computers. Also, while series of blocks and lines have been described with regard to FIG. 7, the order of the blocks and lines may differ in other implementations. Further, non-dependent blocks and/or lines may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
   identifying, by a mobile device, a paired device within a short-range wireless network associated with a vehicle, the paired device having access to a vehicle information system;
   receiving, by the mobile device and from the paired device, vehicle status information from the vehicle information system;
   determining, by the mobile device, whether the vehicle status information triggers a safety mode for the mobile device when the vehicle is in motion and the mobile device is within a safety zone,
   the safety zone being within the vehicle;
   disabling, by the mobile device and while the vehicle is in motion, a display of the mobile device when the vehicle status information triggers the safety mode for the mobile device;
   receiving, by the mobile device, seat sensor information from the vehicle information system;
   determining, by the mobile device, whether the mobile device is in possession of a passenger of the vehicle based on the seat sensor information; and
   enabling, by the mobile device, the display of the mobile device when the mobile device is in the possession of the passenger.

2. The method of claim 1, where the vehicle status information includes one or more of:
   an indication of motion of the vehicle,
   an indication of a transmission position of the vehicle,
   an indication of starting an engine of the vehicle, or
   door sensor information.

3. The method of claim 1,
   where an effective range of the short-range network defines an area for the safety zone.

4. The method of claim 1, where the mobile device includes:
   a radiotelephone,
   a personal communications system (PCS) terminal,
   a personal digital assistant (PDA),
   a laptop computer;
   a multimedia player,
   a gaming device,
   binoculars, or
   a camera.

5. The method of claim 1, where identifying the paired device within the short-range wireless network comprises:
   using a version of a Bluetooth protocol or a version of a Wi-Fi protocol to identify the paired device within the short-range wireless network.

6. The method of claim 1, further comprising:
   receiving, from the paired device and by the mobile device, additional vehicle status information from the vehicle information system;
   determining whether the additional vehicle status information triggers discontinuing of the safety mode for the mobile device; and
   restoring operation of the display of the mobile device when the additional vehicle status information triggers the discontinuing of the safety mode for the mobile device.

7. A mobile device comprising:
   a memory; and
   a processor to:
   identify, via a short-range wireless connection, a computing device associated with a vehicle,
   receive, via the short-range wireless connection, vehicle status information from the computing device,
   determine whether the vehicle status information triggers a safety mode for the mobile device when the vehicle is in motion and the mobile device is within a safety zone,
   the safety zone being within the vehicle,
   disable, while the vehicle is in motion, a display of the mobile device when the vehicle status information triggers the safety mode for the mobile device,
   receive seat sensor information from the computing device,
   determine whether the mobile device is in possession of a passenger of the vehicle based on the seat sensor information, and
   enable the display of the mobile device when the mobile device is in the possession of the passenger.

8. The mobile device of claim 7, where the vehicle status information includes one or more of:
   an indication of motion of the vehicle,
   an indication of a transmission position of the vehicle, door sensor information,
a vehicle speed in relation to a posted speed limit, or
a vehicle speed in relation to a proximity to another vehicle.

9. The mobile device of claim 7,
where an effective range of the short-range wireless connection defines an area for the safety zone.

10. The mobile device of claim 7, where, when identifying the computing device, the processor is to:
use a version of a Bluetooth protocol or a version of a Wi-Fi protocol to identify the computing device via the short-range wireless connection.

11. The mobile device of claim 7, where the mobile device comprises one or more of:
a radiotelephone,
a personal communications system (PCS) terminal,
a personal digital assistant (PDA), or
a laptop computer.

12. The mobile device of claim 7, where the processor is further to:
receive, via the short-range wireless connection, additional vehicle status information from the computing device, and
restore operation of the display of the mobile device based on the additional vehicle status information.

13. The mobile device of claim 7, where the processor is further to:
notify another device in communication with the mobile device that the display is disabled.

14. A mobile device comprising:
a memory; and
a processor to:
receive vehicle status information from a computer within a vehicle,
determine whether the vehicle status information triggers a safety mode for the mobile device while the vehicle is in motion and the mobile device is within a safety zone,
the safety zone being within the vehicle,
disable a display of the mobile device when the vehicle status information triggers the safety mode for the mobile device while the vehicle is in motion,
receive seat sensor information from the computer;
determine whether the mobile device is in possession of a passenger of the vehicle based on the seat sensor information; and
enable the display of the mobile device when the mobile device is in the possession of the passenger.

15. The mobile device of claim 14, where the mobile device comprises one or more of:
a radiotelephone,
a personal communications system (PCS) terminal,
a personal digital assistant (PDA),
a laptop computer,
a multimedia player,
a gaming device,
binoculars, or
a camera.

16. The mobile device of claim 14, where the vehicle status information includes one or more of:
an indication of motion of the vehicle,
an indication of a transmission position of the vehicle, or
door sensor information.

17. An electronic device comprising:
a memory; and
a processor to:
identify a paired device within a short-range wireless network associated with a vehicle;
receive, from the paired device, vehicle status information;
determine whether the vehicle status information triggers a safety mode for the electronic device when the vehicle is in motion and the electronic device is within a safety zone,
the safety zone being within the vehicle;
disable a display of the electronic device when the vehicle status information triggers the safety mode;
receive seat sensor information from the paired device;
determine whether the electronic device is in possession of a passenger of the vehicle based on the seat sensor information; and
enable the display of the electronic device when the electronic device is in the possession of the passenger.

18. The electronic device of claim 17,
where the vehicle status information is different from the seat sensor information.

19. The method of claim 1, further comprising:
allowing, by the mobile device, one or more other features of the mobile device to remain operational when the vehicle status information triggers the safety mode for the mobile device,
the one or more other features comprising at least one of:
a voice-activated application of the mobile device, or
a hands-free tool of the mobile device.

20. The method of claim 1, further comprising:
determining, based on the vehicle status information, whether the vehicle is within a particular distance of another vehicle; and
disabling an additional feature, of the mobile device, when the vehicle is within the particular distance of the other vehicle,
the additional feature being different from the display.

* * * * *